US012585394B2

(12) United States Patent
Eyerman et al.

(10) Patent No.: US 12,585,394 B2
(45) Date of Patent: Mar. 24, 2026

(54) VISUALIZING MEMORY BANDWIDTH UTILIZATION USING MEMORY BANDWIDTH STACK

(71) Applicant: Intel Corporation, Santa Clara, CA (US)

(72) Inventors: Stijn Eyerman, Evergem (BE); Wim Heirman, Ghent (BE); Ibrahim Hur, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 757 days.

(21) Appl. No.: 17/824,413

(22) Filed: May 25, 2022

(65) Prior Publication Data

US 2022/0283719 A1     Sep. 8, 2022

(51) Int. Cl.
G06F 3/06 (2006.01)
(52) U.S. Cl.
CPC .......... G06F 3/0631 (2013.01); G06F 3/0604 (2013.01); G06F 3/0673 (2013.01)
(58) Field of Classification Search
CPC ..... G06F 3/0631; G06F 3/0604; G06F 3/0673
See application file for complete search history.

(56) References Cited

U.S. PATENT DOCUMENTS

| | | | | | |
|---|---|---|---|---|---|
| 2012/0066439 | A1* | 3/2012 | Fillingim | .............. | G06F 3/0653 |
| | | | | | 711/E12.008 |
| 2012/0117226 | A1* | 5/2012 | Tanaka | ................ | H04L 41/5041 |
| | | | | | 709/224 |
| 2012/0272186 | A1* | 10/2012 | Kraut | .................. | G06F 3/04847 |
| | | | | | 715/810 |
| 2013/0055146 | A1* | 2/2013 | Armitage | .............. | G06F 16/904 |
| | | | | | 715/781 |
| 2015/0281408 | A1* | 10/2015 | Kwan | ................. | H04L 63/0227 |
| | | | | | 370/474 |
| 2019/0213762 | A1* | 7/2019 | Lee | ........................ | G06F 3/0484 |
| 2020/0225883 | A1* | 7/2020 | Bhimani | ................. | G06F 18/23 |
| 2022/0171690 | A1* | 6/2022 | Tougher | ................ | G06F 11/076 |
| 2023/0289291 | A1* | 9/2023 | Lee | ........................ | G06N 3/063 |

OTHER PUBLICATIONS

Intel, Finding Your Memory Access Performance Bottlenecks, Jul. 2, 2018 (Year: 2018).*

* cited by examiner

*Primary Examiner* — Ryan Bertram
(74) *Attorney, Agent, or Firm* — JAFFERY WATSON HAMILTON & DESANCTIS LLP

(57)     ABSTRACT

An apparatus to facilitate generating a memory bandwidth stack for visualizing memory bandwidth utilization is disclosed. The apparatus includes processors to receive data corresponding to a memory cycle occurring during a total execution time of an application executed by the one or more processors; for the memory cycle, assign the memory cycle to a component of a bandwidth stack based on analysis of the data and in accordance with a prioritization scheme; for the component, determine a portion of the bandwidth stack to account to the component based at least in part on the assignment of the memory cycle to the component; and generate the bandwidth stack by at least representing the portion accounted to the component in the bandwidth stack.

19 Claims, 9 Drawing Sheets

300

300

305

700

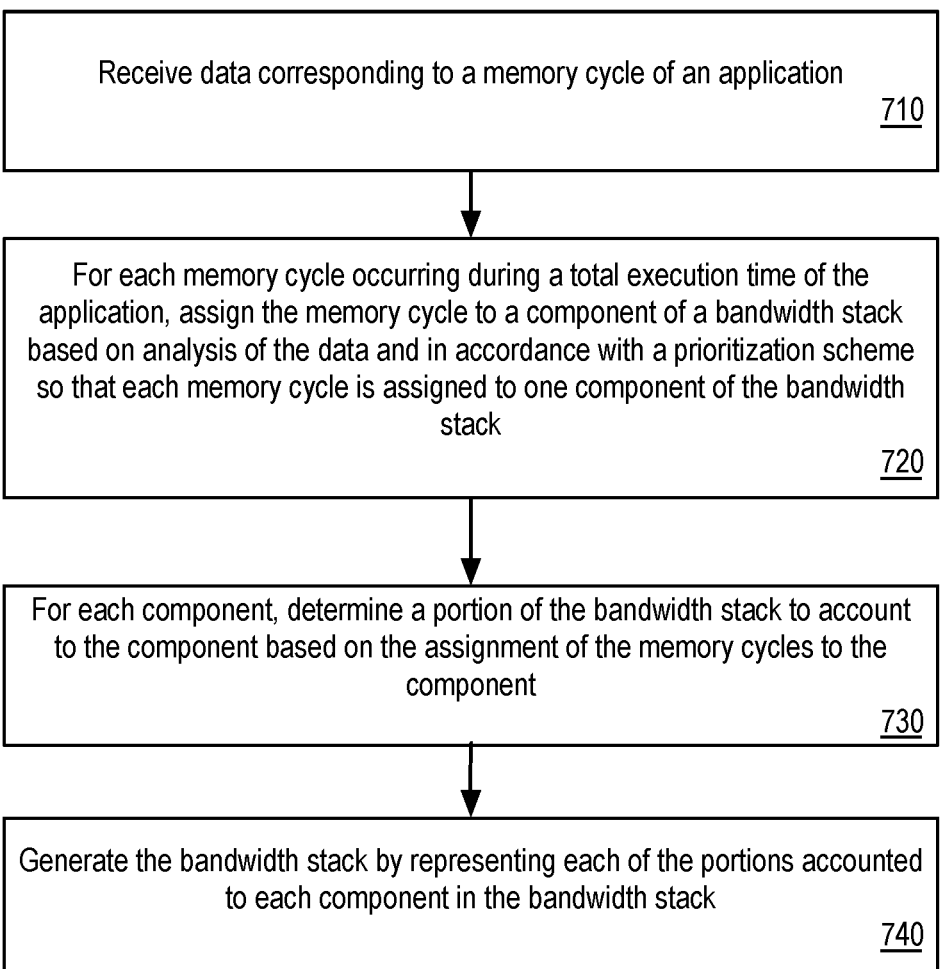

Receive data corresponding to a memory cycle of an application

710

For each memory cycle occurring during a total execution time of the application, assign the memory cycle to a component of a bandwidth stack based on analysis of the data and in accordance with a prioritization scheme so that each memory cycle is assigned to one component of the bandwidth stack

720

For each component, determine a portion of the bandwidth stack to account to the component based on the assignment of the memory cycles to the component

730

Generate the bandwidth stack by representing each of the portions accounted to each component in the bandwidth stack

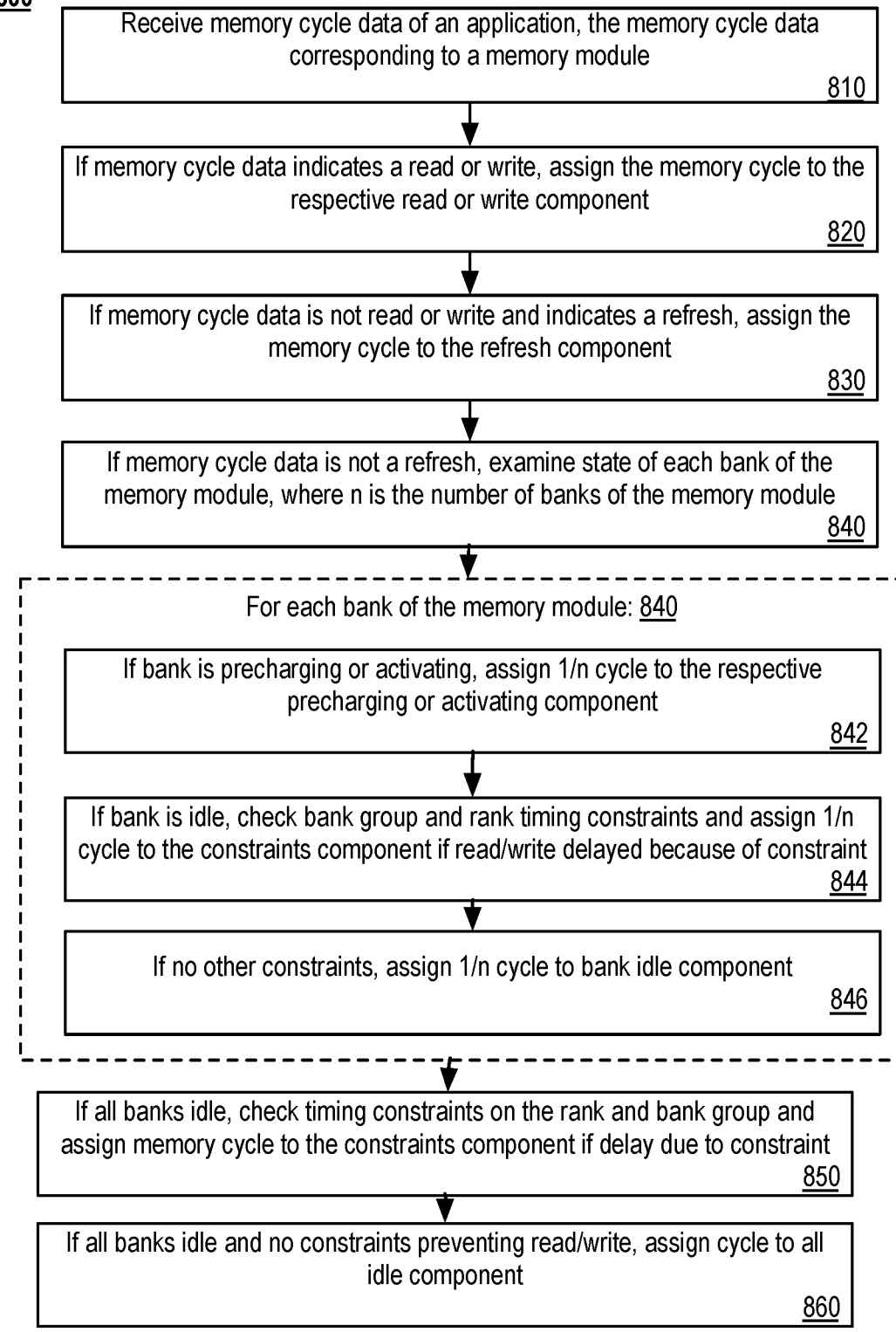

800

Receive memory cycle data of an application, the memory cycle data corresponding to a memory module

810

If memory cycle data indicates a read or write, assign the memory cycle to the respective read or write component

820

If memory cycle data is not read or write and indicates a refresh, assign the memory cycle to the refresh component

830

If memory cycle data is not a refresh, examine state of each bank of the memory module, where n is the number of banks of the memory module

840

For each bank of the memory module: 840

If bank is precharging or activating, assign 1/n cycle to the respective precharging or activating component

842

If bank is idle, check bank group and rank timing constraints and assign 1/n cycle to the constraints component if read/write delayed because of constraint

844

If no other constraints, assign 1/n cycle to bank idle component

846

If all banks idle, check timing constraints on the rank and bank group and assign memory cycle to the constraints component if delay due to constraint

850

If all banks idle and no constraints preventing read/write, assign cycle to all idle component

VISUALIZING MEMORY BANDWIDTH UTILIZATION USING MEMORY BANDWIDTH STACK

FIELD

Embodiments relate generally to memory bandwidth of a processing system, and more particularly to a generating a memory bandwidth stack for visualizing memory bandwidth utilization.

BACKGROUND OF THE DESCRIPTION

Memory bandwidth is one of the major performance parameters of a processor, next to core count, chip frequency and cache size. The performance of memory-bound applications is often determined by how much memory bandwidth the applications can utilize. Memory device specifications refer to the peak bandwidth a certain memory chip can obtain; for example, a common DDR4-2400 chip has a peak bandwidth of 19.2 GB/s (i.e., 2400 MT/s×8B memory channel width). However, the peak bandwidth assumes perfect circumstances and is typically not achieved in practice. Instead, a memory-bound application may often experience sub-optimal bandwidth usage.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 7 is a flow diagram illustrating an embodiment of a method for generating a memory bandwidth stack for visualizing memory bandwidth utilization.

FIG. 8 is a flow diagram illustrating an embodiment of a method for applying a prioritization scheme for assigning memory cycle to a bandwidth stack for visualizing memory bandwidth utilization.

DETAILED DESCRIPTION

Figure 1:
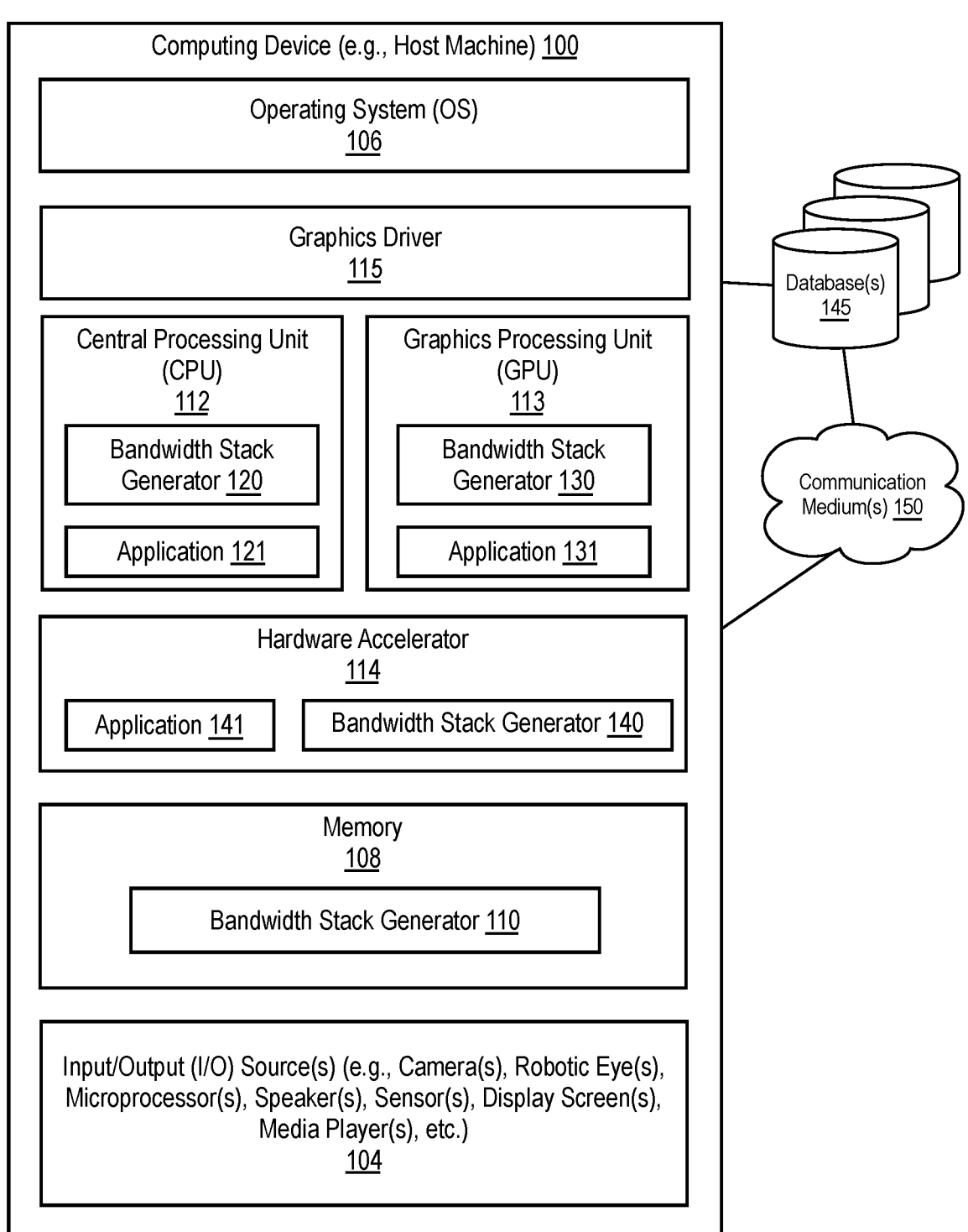
FIG. 1 illustrates a computing device employing a bandwidth stack generator for generating a memory bandwidth stack for visualizing memory bandwidth utilization, according to implementations of the disclosure.

Implementations of the disclosure describe generating a memory bandwidth stack for visualizing memory bandwidth utilization. Memory bandwidth is one of the major performance parameters of a processor, next to core count, chip frequency and cache size. The performance of memory-bound applications is often determined by how much memory bandwidth the applications can utilize. Memory device specifications refer to the peak bandwidth a certain memory chip can obtain; for example, a common DDR4-2400 chip has a peak bandwidth of 19.2 GB/s (i.e., 2400 MT/s×8B memory channel width). However, the peak bandwidth assumes perfect circumstances and is typically not achieved in practice. Instead, a memory-bound application may often experience sub-optimal bandwidth usage.

Because performance is determined by bandwidth usage, it is helpful to accurately measure and determine the causes of sub-optimal bandwidth usage, as well as identify how such causes can be bypassed. Due to the complexity of memory operations, it is not clear what the causes of low bandwidth usage are and how the bandwidth usage can be increased. Providing these insights in an intuitive way would be helpful in analyzing and optimizing the performance of a memory-bound application.

One conventional approach for measuring and providing memory bandwidth usage includes measuring raw bandwidth usage. Measuring raw bandwidth usage includes utilizing performance counters (e.g., on hardware) or simulators to provide raw bandwidth usage numbers and potentially counters for certain DRAM events (page hits/misses, refreshes). Another conventional approach for measuring and providing memory bandwidth usage includes tracing. For example, many DRAM simulators can also collect a trace of DRAM commands. DRAM technical sheets contain the peak bandwidth of a DRAM chip, along with timing restrictions on DRAM commands, refresh cycles, and other constraints.

However, these conventional approaches have drawbacks. For example, the raw bandwidth numbers indicate when bandwidth usage is low, but provide no explanation. Event counters can give some indications of bandwidth usage, but it is unclear what the impact is of each event on total bandwidth consumption. Furthermore, a thorough manual examination of the DRAM command trace, along with the timing constraints of the technical sheet, can give insight into the bandwidth bottlenecks, but this utilizes expertise and a lot of time. There is currently no comprehensive visual representation of bandwidth usage and bottlenecks, providing useful information to analyze and optimize bandwidth usage.

Implementations of the disclosure address the above-noted technical drawbacks of the conventional approaches by providing for generation of a memory bandwidth stack for visualizing memory bandwidth utilization. In implementations herein, techniques are provided to generate a bandwidth stack representation of bandwidth that includes measurements of components of the bandwidth. The components can include reads, writes, precharge, activate, refresh, constraints, bank idle, and all idle, to name a few examples. The height of a bandwidth stack equals peak bandwidth. The 'usage' component (e.g., read and write components) at the bottom of the stack represents the actual bandwidth usage, and the other components (e.g., precharge, activate, refresh, constraints, bank idle, and all idle) represent how much impact different bandwidth restricting causes have on not reaching the peak bandwidth.

Implementations measure the components that are used to generate the bandwidth stack. Implementations may measure the components of memory bandwidth of an executing application during simulation or through analyzing a DRAM command trace, for example. Measuring the components of the bandwidth stack may include a process to assign each memory cycle to a component. In some implementations, a cycle can be broken into portions (or fractions), where components may be assigned to each portion of the memory cycle.

Implementations of the disclosure provide technical advantages over the conventional approaches discussed above. One technical advantage is that bandwidth stacks can provide useful information to analyze and optimize the bandwidth usage of an application, which results in a more efficient and faster execution. It is complementary to other performance analysis tools, such as cycle stacks (top-down) for core performance and speedup stacks for parallel efficiency. Collecting bandwidth stacks on customer workloads also provides useful information on what to address in future memory controller designs to improve bandwidth usage. For example, providing bandwidth stacks can give more insight into how applications interact with memory, and how this can be optimized. This allow for additional insights and a better understanding of the performance of an application running on a system.

FIG. 1 illustrates a computing device 100 employing a bandwidth stack generator for generating a memory bandwidth stack for visualizing memory bandwidth utilization, according to implementations of the disclosure. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment, self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SOC" or "SoC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), user-mode driver framework (UMDF), or simply "driver") 115, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be utilized for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, memory 108 of computing device 100 may include one or more memory modules, such as dual in-line memory modules (DIMMs). The DIMMs may host dynamic random access memory (DRAM). DRAM is a type of high performance memory that stores each bit of data in a memory cell, which may include a capacitor and/or a transistor. In designs where a capacitor is used, the capacitor can be charged or discharged, where these two states are taken to represent the two values of a bit, conventionally called 0 and 1. The electric charge on the capacitors gradually leaks away and without intervention the data on the capacitor can be lost. To prevent this, DRAM utilizes an external memory refresh circuit that periodically rewrites the data in the capacitors, restoring them to their original charge. DRAM can take the form of an integrated circuit chip and can include dozens to billions of DRAM memory cells.

In implementations herein, the DRAM of memory 108 may be implemented in the form a double rate data (DDR) memory module, where data is transferred on both the rising and falling edges of the clock signal of the computing device 100. In some implementations, the DDR memory module may be any of DDR1 through DDR5, for example. In some implementations, the DDR memory module may be implemented as graphics DDR (GDDR) memory modules. In some implementations, memory 108 may be provided as any type of memory providing high-performance bandwidth, such as High Performance Bandwidth memory (HBM).

In one embodiment, as illustrated, bandwidth stack generator 110 may be hosted by memory 108 in communication with I/O source(s) 104, such as microphones, speakers, etc., of computing device 100. Bandwidth stack generator 110 may provide for generating a memory bandwidth stack for visualizing memory bandwidth utilization of memory 108 by an application hosted on computing device 100, such as application 121, 131, and/or 141 hosted by any of CPU 112, GPU 113, and/or hardware accelerator 114. In some implementations, portions of application 121, 131, 141 may be hosted by one or more of CPU 112, GPU 113, and/or hardware accelerator 114. In some implementations, bandwidth stack generator 110 may generate a memory bandwidth stack for visualizing memory bandwidth utilization of a simulated application running on an emulated processor, where one or more of CPU 112, GPU 113, and/or hardware accelerator 114 provide the simulated application running on the emulated processor.

In another embodiment, bandwidth stack generator 110 may be part of or hosted by operating system 106. In yet another embodiment, bandwidth stack generator 110 may be hosted or facilitated by graphics driver 115. In yet another embodiment, bandwidth stack generator 110 may be hosted by or part of a hardware accelerator 114; for example, bandwidth stack generator 110 may be embedded in or implemented as part of the processing hardware of hardware accelerator 114, such as in the form of bandwidth stack generator 140. In yet another embodiment, bandwidth stack generator 110 may be hosted by or part of graphics processing unit ("GPU" or simply graphics processor") 113 or firmware of graphics processor 113; for example, bandwidth stack generator 110 may be embedded in or implemented as part of the processing hardware of graphics processor 113, such as in the form of bandwidth stack generator 130. Similarly, in yet another embodiment, bandwidth stack generator 110 may be hosted by or part of central processing unit ("CPU" or simply "application processor") 112; for example, bandwidth stack generator 110 may be embedded in or implemented as part of the processing hardware of CPU 112, such as in the form of bandwidth stack generator 120. In some embodiments, bandwidth stack generator 110 may be provided by one or more processors including one or more of a graphics processor, an application processor, and another processor, wherein the one or more processors are co-located on a common semiconductor package.

It is contemplated that embodiments are not limited to certain implementation or hosting of bandwidth stack generator 110 and that one or more portions or components of bandwidth stack generator 110 may be employed or implemented as hardware, software, or any combination thereof, such as firmware. In one embodiment, for example, the bandwidth stack generator 110 may be hosted by a machine learning processing unit which is different from the GPU 113. In another embodiment, the bandwidth stack generator 110 may be distributed between a machine learning processing unit and a CPU 112. In another embodiment, the bandwidth stack generator 110 may be distributed between a machine learning processing unit, a CPU 112 and a GPU 113. In another embodiment, the bandwidth stack generator 110 may be distributed between a machine learning processing unit, a CPU 112, a GPU 113, and a hardware accelerator 114.

It is further contemplated that embodiments are not limited to certain implementation or hosting of bandwidth stack generator 110 and that one or more portions or components of bandwidth stack generator 110 may be employed or implemented in more than one computing device (e.g., host machine) 100 and is not solely limited to implementation in a single computing device 100.

Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Computing device 100 is further illustrated as having access to and/or being in communication with one or more database(s) 145 and/or one or more of other computing devices over one or more communication medium(s) 150 (e.g., networks such as a proximity network, a cloud network, the Internet, etc.).

In some embodiments, database(s) 145 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

Computing device 100 may host network interface(s) (not shown) to provide access to the communication medium 150 (e.g., a network), such as a LAN, a wide area network (WAN), a metropolitan area network (MAN), a personal area network (PAN), Bluetooth, a cloud network, a mobile network (e.g., $3_{rd}$ Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
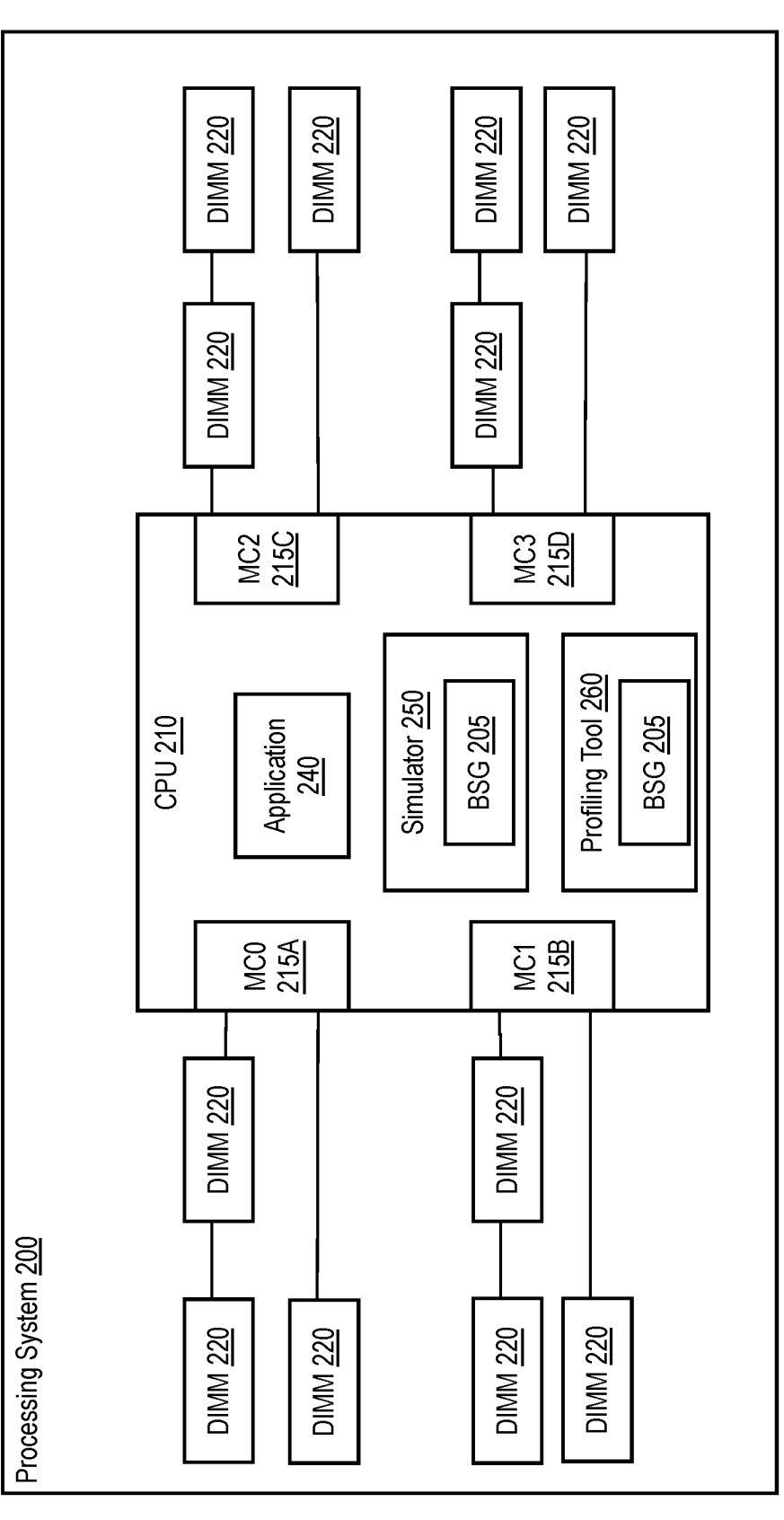
FIG. 2 depict an illustration of a processing system to provide for generating a memory bandwidth stack for visualizing memory bandwidth utilization, according to some embodiments.

FIG. 2 depict an illustration of a processing system 200 to provide for generating a memory bandwidth stack for visualizing memory bandwidth utilization, according to some embodiments. In one embodiment, processing system 200 may be the same as computing device 100 described with respect to FIG. 1.

As illustrated in FIG. 2, processing system 200 may be embodied as and/or may include any number and type of hardware and/or software components, such as (without limitation) a processor, including but not limited to, a central processing unit ("CPU" or simply "application processor"), a graphics processing unit ("GPU" or simply "graphics processor"), and so on. Processing system 200 may also include components such as drivers (also referred to as "driver logic", user-mode driver (UMD), UMD, user-mode driver framework (UMDF), UMDF, "GPU driver", "graphics driver logic", or simply "driver"), memory, network devices, or the like, as well as input/output (I/O) sources, such as touchscreens, touch panels, touch pads, virtual or regular keyboards, virtual or regular mice, ports, connectors, etc. Although not specifically illustrated, processing system 200 may include or enable operation of an OS (not shown) serving as an interface between hardware and/or physical resources of the processing system 200 and a user.

It is to be appreciated that a lesser or more equipped system than the example described above may be utilized for certain implementations. Therefore, the configuration of processing system 200 may vary from implementation to implementation depending upon numerous factors, such as price constraints, performance requirements, technological improvements, or other circumstances.

Embodiments of processing system 200 may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or combinations of software and hardware.

Processing system 200 may further include (without limitations) large computing systems, such as server computers, desktop computers, etc., and may further include set-top boxes (e.g., Internet-based cable television set-top boxes, etc.), global positioning system (GPS)-based devices, etc. Processing system 200 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, processing system 200 may include a mobile computing device employing a computer platform hosting an integrated circuit ("IC"), such as system on a chip ("SoC" or "SOC"), integrating various hardware and/or software components of processing system 200 on a single chip.

Processing system 200 may host network interface(s) (not shown) to provide access to a network, such as a LAN, a wide area network (WAN), a metropolitan area network (MAN), a personal area network (PAN), Bluetooth, a cloud network, a mobile network (e.g., $3_{rd}$ Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

In one embodiment, processing system 200 can include, a single processor desktop system, a multiprocessor workstation system, or a server system having a large number of processors or processor cores. In one embodiment, the processing system 200 can be a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 200 may couple with, or be integrated within: a server-based gaming platform; a game console, including a game and media console; a mobile gaming console, a handheld game console, or an online game console. In some embodiments the processing system 200 is part of a mobile phone, smart phone, tablet computing device or mobile Internet-connected device such as a laptop with low internal storage capacity. Processing system 200 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, processing system 200 includes or is part of a television or set top box device. In one embodiment, processing system 200 can include, couple with, or be integrated within a self-driving vehicle such as a bus, tractor trailer, car, motor or electric power cycle, plane or glider (or any combination thereof). The self-driving vehicle may use processing system 200 to process the environment sensed around the vehicle.

In some embodiments, the processing system 200 includes one or more processors, such as a CPU (e.g., CPU 210) or GPU, which each include one or more processor cores to process instructions which, when executed, perform operations for system or user software. In some embodiments, at least one of the one or more processor cores is configured to process a specific instruction set. In some embodiments, instruction set may facilitate Complex Instruction Set Computing (CISC), Reduced Instruction Set Computing (RISC), or computing via a Very Long Instruction Word (VLIW). One or more processor cores may process a different instruction set which may include instructions to facilitate the emulation of other instruction sets. Processor core may also include other processing devices, such as a Digital Signal Processor (DSP).

In implementations of the disclosure, processing system 200 provides for generating a memory bandwidth stack for visualizing memory bandwidth utilization. As shown in FIG. 2, processing system 200 may include, but is not limited to, a processor, such as CPU 210 communicably coupled to host-attached memory modules such as DIMMs 220. In one implementations, CPU 210 is the same as CPU 112 described with respect to FIG. 1 and DIMMs 220 are the same as memory 108 described with respect to FIG. 1. More or less components than those illustrated in FIG. 2 may be included in processing system 200. The components of processing system 200 may be connected by way of a system bus or other electrical communication path (not shown).

In one implementation, DIMM 220 may include DRAM memory modules, such as any of DDR 1 to DDR5 memory, for example. CPU 210 may include a plurality of memory controllers including MC0 215A, MC1 215B, MC2 215C, and MC3 215D to manage input and output with the DIMM 220.

As discussed further below, the components of processing system 200 are operative to provide a bandwidth stack generator (BSG) 205 for generating a memory bandwidth stack for visualizing memory bandwidth utilization of DIMMs 220. The memory bandwidth may be utilized by an application 240 executed by CPU 210. In one embodiment, bandwidth stack generator 205 may be implemented by a simulator 250 or a profiling tool 260 hosted by the CPU 210. The simulator 250 may simulate execution of application 240 by an emulated hardware processor. The profiling tool 260 may analyze execution of application 240 by the CPU 210 itself.

As previously discussed, a primary characteristic of a DRAM module in DIMM 220 is its peak bandwidth, often implied by the frequency specification. For example, a DDR4-2400 chip of DIMM 220 can have a 2400 MHz frequency (actually 1200 MHz, but the channel can send a data packet on the rising and falling edge of the clock (double data rate or DDR)), and given the channel width of 8 bytes, this translates to a 19.2 GB/s peak bandwidth.

This peak bandwidth is not reached in a practical setting because it assumes ideal circumstances. The DRAM chip needs to be regularly refreshed to prevent data loss, making it inaccessible during refresh cycles. Accesses to different rows on the same bank utilize a writeback of the current row, opening a new row and selecting the requested columns, which takes considerably more time than accesses to the same row. Reads and writes have a different address-data command sequence, adding extra latency for back-to-back read and write operations. These and other constraints have a considerable impact on the maximum achievable bandwidth usage.

Bandwidth usage is a contributor to performance for memory-bound applications, such as application 240. Increasing bandwidth usage often results in increased performance and a more efficient use of memory resources. Bandwidth usage can be directly measured on the hardware or by a simulator, but if this number is much lower than the peak or expected bandwidth usage, the raw bandwidth usage number provides no insight in the causes and potential solutions for the low bandwidth usage.

A bandwidth stack, consisting of multiple stacked components, is an intuitive way to represent how a metric (performance, bandwidth usage) is impacted by multiple factors. The bandwidth stack generator 205 of implementations herein may generate a bandwidth stack that provides a stacked representation to visualize and analyze memory bandwidth usage.

Figure 3:
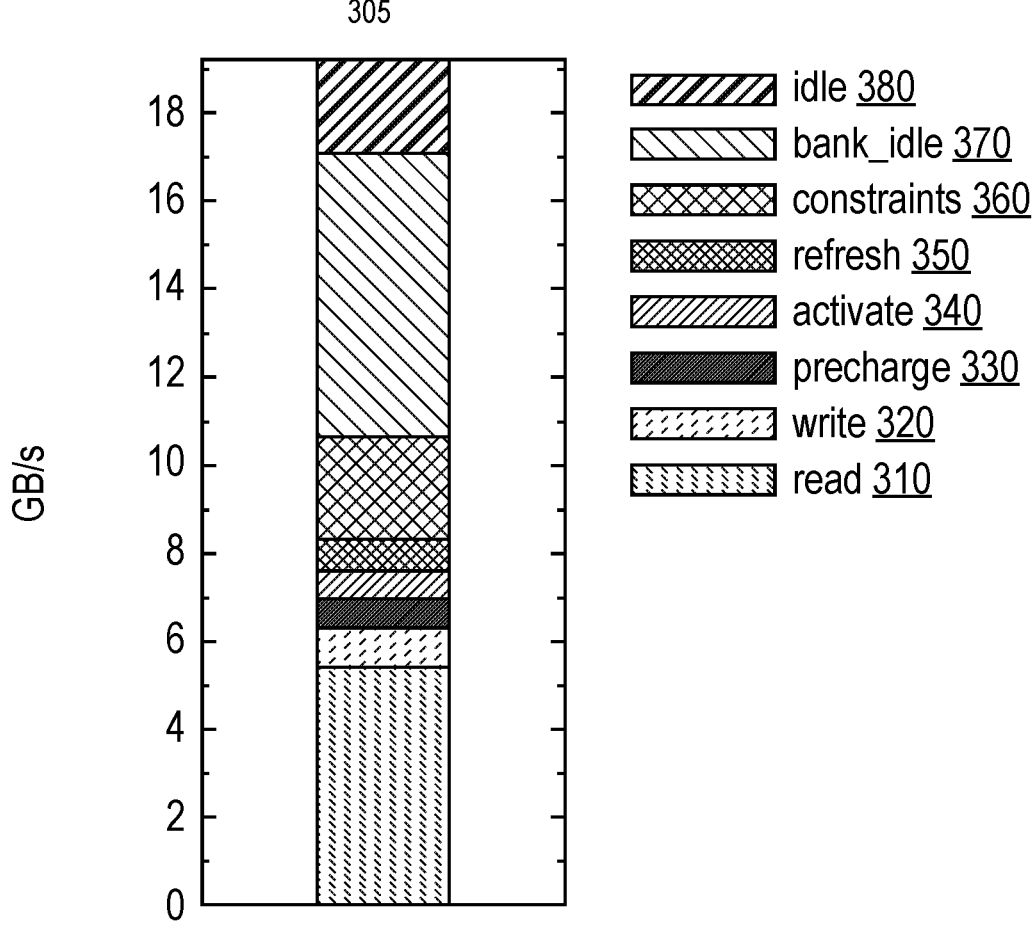
FIG. 3 is a block diagram illustrating an example bandwidth stack to represent memory bandwidth utilization by an application, in accordance with embodiments herein.

FIG. 3 is a block diagram illustrating an example bandwidth stack 300 to represent memory bandwidth utilization by an application, in accordance with embodiments herein. In one implementation, bandwidth stack 300 may be generated by bandwidth stack generator 205 described with respect to FIG. 2. The top of the bandwidth stack 300 can equal the peak bandwidth 305 (e.g., 19.2 GB/s for a DDR4-2400 chip). The bottom component(s) of the bandwidth stack 300, including the read component 310 and the write component 320, can represent the actually-achieved bandwidth (i.e., the total number of bytes read from 310 and written to 320 memory divided by the execution time) of the application. The remainder of the bandwidth stack 300 (e.g., the difference between the peak 305 and the achieved bandwidth (310 and 320)) is divided in multiple components 330-380 representing the impact each remaining component 330-380 contributes to not achieving the peak bandwidth 305. These remaining components can include, but are not limited to, precharge 330, activation 340, refresh 350, constraints 360, bank idle time 370, and full idle time 380. In some implementations, other components than those listed above may be included in the bandwidth stack 300 and the bandwidth stack 300 is not limited to solely those components 310-380 discussed herein.

As shown in FIG. 3, the example bandwidth stack 300 has a peak bandwidth 305 of 19.2 GB/s. Reads 310 account for 5.4 GB/s and writes 320 for 1.0 GB/s, totaling to 6.4 GB/s achieved bandwidth. 1.3 GB/s is lost because row buffers are to be precharged 330 and activated 340 when a row conflict occurs, indicating low locality in the address stream. 0.7 GB/s is lost because of refreshes 350, which are intrinsic to DRAM technology and cannot be avoided (actually limiting the maximum achievable bandwidth to 18.5 GB/s). 2.3 GB/s is overhead due to timing constraints 360, such as delays of switching between reads and writes, and other delays that are enforced between two commands.

The two top components 370-380 of the bandwidth stack 300 are idle components. The idle components 370-380 represent when there are not enough requests from the cores to saturate the bandwidth. The top component, full idle 380, reflects the time (and thus lost bandwidth usage opportunity) when the full DRAM chip is idle. The second from top component, bank idle 370, represents the time when at least one bank of the chip is serving a request, but some banks are idle and could serve more requests, increasing bandwidth usage. Both idle components 370-380 can be reduced (and thus the achieved bandwidth increased) by generating more requests (more threads, more memory-level parallelism), but only the full idle component 380 is guaranteed to reduce. The bank idle component 370 reduces if these requests go to different banks than the ones that are already active.

Implementations of the disclosure further provide for a technique to measure the components of the bandwidth stack (e.g., components 310-380 of bandwidth stack 300 of FIG. 3). Implementations may measure the components of memory bandwidth of an executing application during simulation or through analyzing a DRAM command trace, for example. Measuring the components of the bandwidth stack may include a process to assign each memory cycle to a component.

With respect to the above-provided example of a DDR4-2400 memory module, given that the channel can send 2×8B per cycle, each cycle can account for '16B/total_ execution_time' of total bandwidth. This ensures that the sum all components of the bandwidth stack equals the peak bandwidth.

With respect to an example DRAM memory module, DRAM chips are organized hierarchically in channels, ranks, bank groups, and banks, with multiple entities at each level operating in parallel. Therefore, accounting a cycle to a single component is not straightforward. For example, while the channel transfers data from a read to the memory controller, some banks can be executing a precharge command, while other banks are idle and while one of the bank groups is blocked because of a timing constraint. As such, each cycle should be assigned a bandwidth component once, otherwise the components will not add to the peak bandwidth.

Peak bandwidth is defined as the peak channel bandwidth, so each cycle the channel is transferring data from a read or write request is assigned as a useful read or write cycle. On a cycle when the channel is not transferring data, a cause can be determined for why the channel is idle.

Implementations provide for a prioritization scheme when measuring and accounting the components of the bandwidth stack. One example prioritization scheme is as follows:

(1) If the chip is currently refreshing (or closing pages to start a refresh), this cycle is assigned to the refresh component.

(2) If it is not in a refresh cycle, we look at the state of each bank. If one or more banks are precharging or activating, we go over all banks, assigning 1/n cycle (to avoid floating point calculations, we assign one cycle for each bank, and divide by the number of banks afterwards, when constructing the stack) for each bank, with n the number of banks in the memory:

(a) If the bank is precharging or activating, we assign 1/n cycle to the respective component.

(b) If the bank is idle, we check the corresponding bank group and rank timing constraints. If the read or write operation was delayed because of a constraint, we add 1/n cycle to the constraints component.

(c) If there are no other constraints, 1/n cycle is added to the bank_idle component.

(3) If all banks are idle, we again check for timing constraints on the rank and bank group level and assign the cycle to the constraints component if that is the case.

(4) If all banks are idle and there are no other constraints preventing a read or write to occur, the total chip is idle and thus the cycle is assigned to the idle component.

By using this priority scheme and not looking further once a cycle is assigned, the measuring technique for components of the bandwidth stack makes sure not to double-count cycles, which would cause an inconsistent bandwidth stack.

Because of the multiple levels and parallel commands in many memory structures, there is no single correct ordering and/or prioritization to apply. To summarize the behavior in a single intuitive stack, some of the information of concurrently occurring events is lost. On the other hand, trying to keep all of this information will result in an overly complex structure, losing its intuitiveness.

The accounting approach is novel in its procedure to handle overlapping events: if the memory channel is transferring data, all other activity is assumed overlapped and ignored in the bandwidth stack. The non-overlapped events contribute to the bandwidth stack. The approach to measuring and accounting for bank parallelism in implementations herein is novel. For example, if one or a few banks are active, the cycles are not fully accounted to the respective component, but a fraction (corresponding to the number of idle banks) is accounted to the bank idle component, indicating a potential bandwidth improvement by exploiting bank parallelism.

In implementations herein, a bandwidth stack, once measured and visualized, can be utilized to address and/or improve memory utilization of the execution application and/or the underlying hardware. For example, component results in the bandwidth stack may be addressed as detailed below.

Idle (e.g., all idle 380 of FIG. 3): The full DRAM chip is idle; increase the request rate (more threads, more memory-level parallelism).

Bank-idle (e.g., bank idle 370 of FIG. 3): Some banks are idle while others are active; increase the request rate, and if that does not work, make the distribution across the banks more uniform, for example by padding or rearranging data structures.

Precharge/activate (e.g., precharge 330 or activate 340 of FIG. 3): Time is spent in closing and opening pages in banks; increase page hit rate by optimizing locality.

Constraints (e.g., constraints 360 of FIG. 3): Different timing constraints limit throughput; try to avoid constant switching between reads and writes.

Refresh (e.g., refresh 350 of FIG. 3): DRAM rows are refreshed; intrinsic to DRAM operation, no action to be taken.

In some cases, it is not possible to address these issues. The memory address stream is often a characteristic of the application that cannot be changed. The bandwidth stack then shows that this is the case, and that there is no further margin to improve bandwidth utilization.

In some implementations, a database of bandwidth stacks collected can also provide useful information to the design of memory controllers on future processors. For example, if many customer workloads suffer from insufficient bank parallelism, the bank indexing scheme can be redesigned to better distribute accesses across banks. In another example, if read-to-write timing constraints limit bandwidth usage, a larger write buffer can absorb longer write bursts and reduce the number of read-to-write mode transitions.

As previously noted, measuring components of a bandwidth stack can be performed during simulation (e.g., memory simulation or combined processor and memory simulation) or based on a trace of memory commands, generated by hardware or a simulator.

In some implementations, bandwidth stacks can be measured per memory controller (such as MCs 215A-215D of FIG. 2). On some computing chips, such as server chips, there may be multiple memory controllers. In this case, the different bandwidth stacks show the bandwidth distribution across the memory controllers and the bandwidth limiters per memory controller. For example, if one memory controller has large precharge, activate and constraints components, while the others have large idle components, it may be beneficial to improve the distribution of the memory traffic across the memory controllers. On the other hand, if all controllers have large bandwidth limiting components, it may be better to localize traffic, for example by assigning larger chunks of memory to the same memory controller instead of distributing chunks across all memory controllers.

Due to the complexity of the accounting, bandwidth stacks are targeted to be collected during processor and/or memory simulation. Even for simulation, complexity and speed should be considered, to not impractically slow down simulation. Instead of accounting cycle by cycle, as discussed above, some implementations can collect the traces of memory operations on the different levels. These traces can then be analyzed on-the-fly (e.g., do not keep the full trace), by looking at the first read or write on the channel and analyzing the commands before that first channel transfer to find the events that prevented a transfer. Because each command takes a few cycles, multiple cycles can be accounted in one step, which is faster than a cycle-by-cycle approach. As an alternative to integrated simulation, a command trace (including timings) can be collected from the hardware or a DRAM simulator, and the bandwidth stack can be constructed offline from this trace using the accounting mechanism described in this section.

After collecting the components as cycle counts, a post-processing step can transform them into bandwidth components expressed in GB/s. Peak memory bandwidth equals the channel bandwidth, so each cycle corresponds to the amount of data the channel can transfer in a cycle. For example, if the data bus is 8 byte, and 2 transfers can be done per cycle (double data rate), each cycle corresponds to 16 bytes of data. Next, we divide by the total simulation time to obtain a bandwidth number in GB/s. For example, if 1 million memory cycles at 1.2 GHz are simulated, and the precharge component is accounted as 100,000 cycles, the precharge component's bandwidth stack component equals: ((100,000 cycles×16B)÷1,000,000 cycles)×1.2 GHz=1.92 GB/s.

Figure 4:
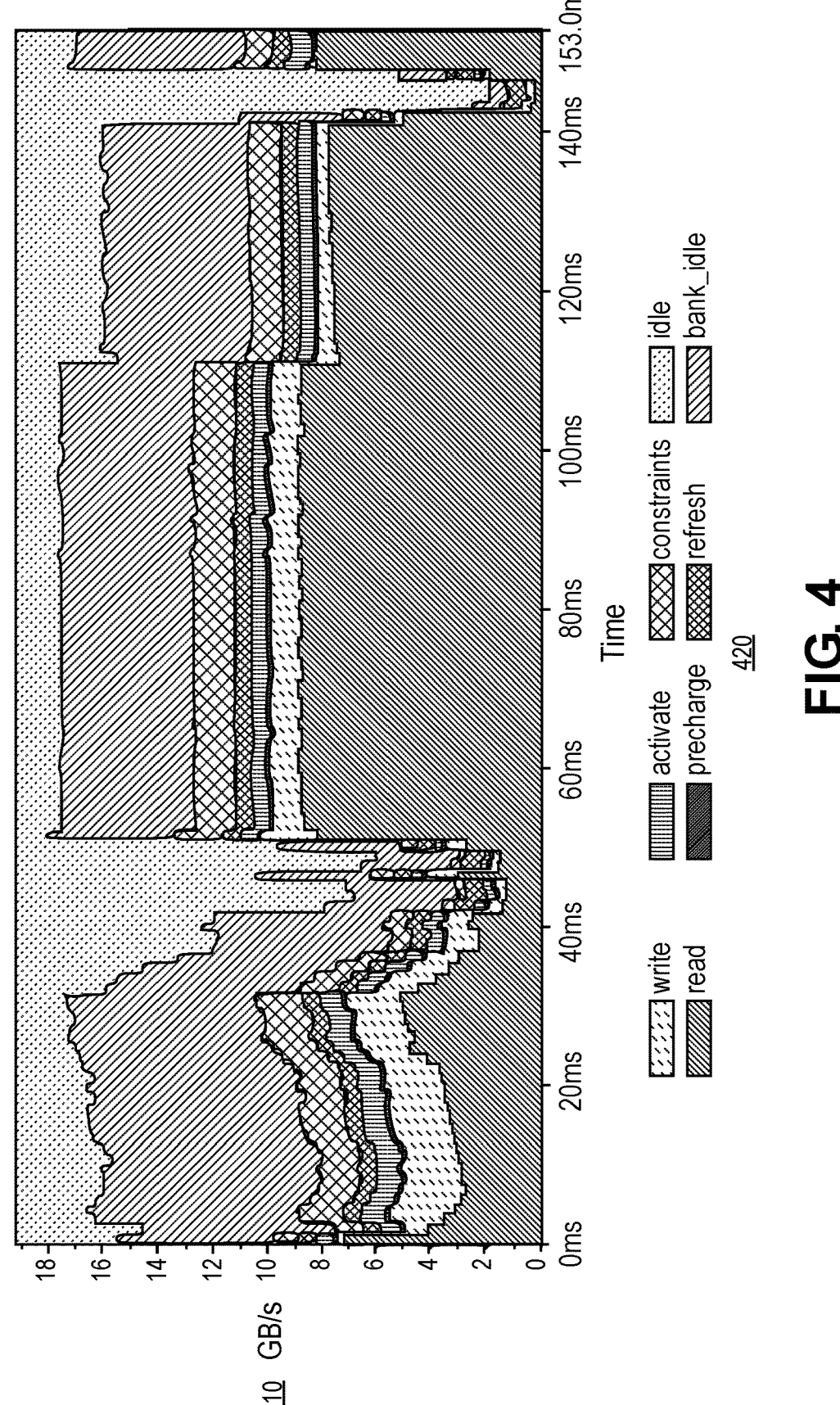
FIG. 4 is an example graph of bandwidth stacks depicting a 'Breadth-First Search' (BFS) application running on four cores with one memory controller, in accordance with implementations herein.

FIG. 4 is an example graph 400 of bandwidth stacks depicting a 'Breadth-First Search' (BFS) application running on 4 cores with 1 DDR4 memory controller, in accordance with implementations herein. The graph 400 of the bandwidth stacks is taken through time 420 (shown in milliseconds (ms)), showing a bandwidth stack 410 for each time step. As such, this graph 400 reveals phases in the application.

Although not specifically illustrated, a corresponding cycle stack of the BFS application may indicate that a first part of the application (until ~30 ms) has large DRAM components, meaning that 30%-35% of the time, the cores are stalled waiting on dram operations. Then, there is a phase until approximately 47 ms with lower parallelism. The next phases, until the end, have a high branch component, but also a high DRAM-bandwidth component, meaning that the core is stalled on memory operations that encountered queueing latency in dram. There is a small phase around 145 ms with a high base component, which means it is compute bound.

The graph 400 for the corresponding bandwidth stacks shows that in the middle phase (between 47 ms and 110 ms), actual bandwidth utilization (read and write) is around 10 GB/s, which is lower than the peak 19.2 GB/s bandwidth (top of stack). However, it also shows that the DRAM chip is fully idle 9% of the time, explaining why there is a bandwidth component in the cycle stack: memory operations are queueing because they access banks that are already active (bank_idle), or because there are timing restrictions preventing them to start immediately (constraints). Page misses and refresh form a smaller bandwidth usage limiter. The phases with lower parallelism (around 40 ms) or that are compute bound (around 145 ms) clearly have lower bandwidth usage.

Because there is still some bandwidth room left (as seen in the idle and bank_idle components), an approach to address the sub-optimal bandwidth utilization may be taken by doubling the number of cores to 8 cores on 1 DDR4 memory controller. A corresponding bandwidth stack for such an example approach is shown in FIG. 5.

Figure 5:
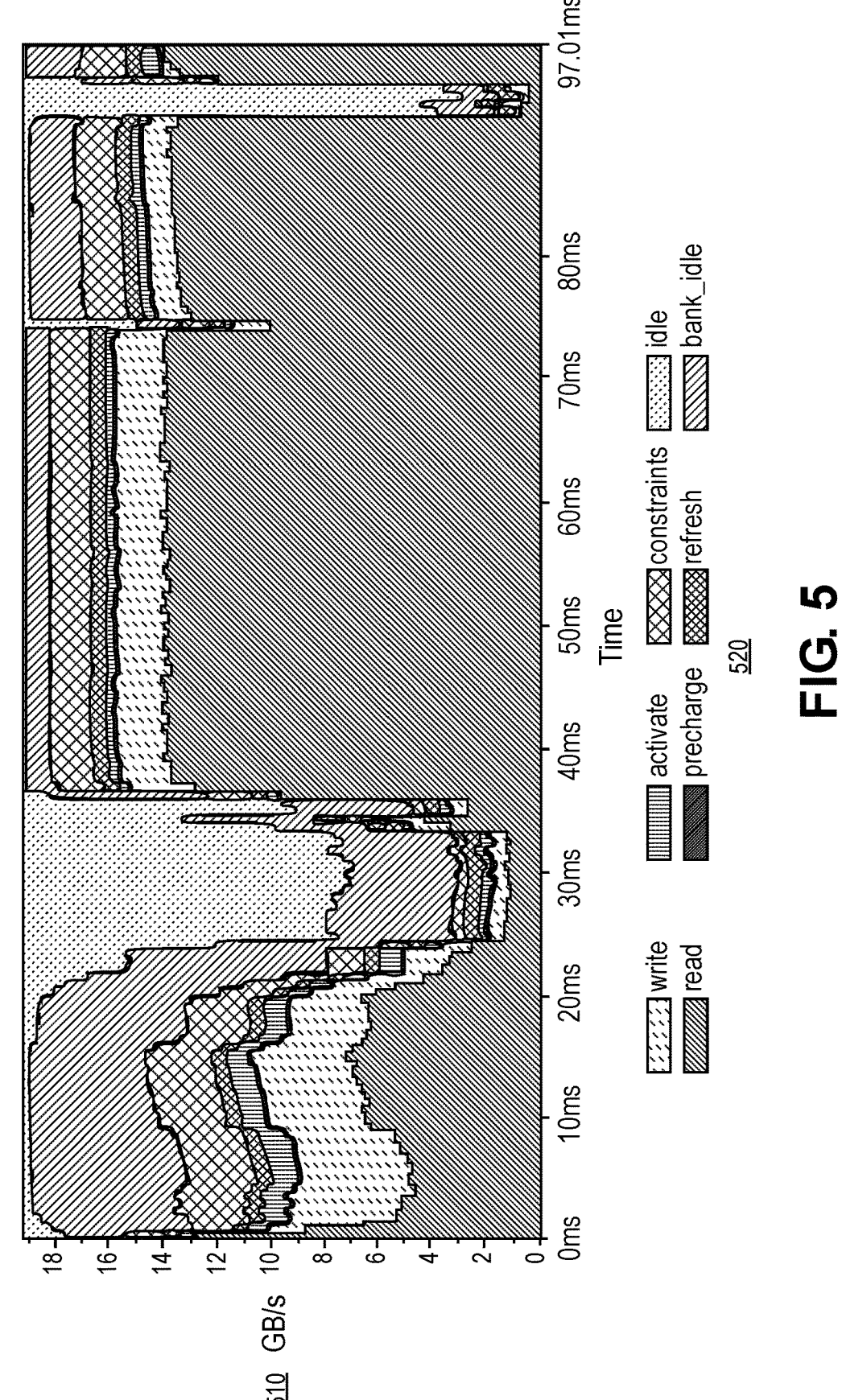
FIG. 5 is an example graph of bandwidth stacks depicting the BFS application running on eight cores with one memory controller, in accordance with implementations herein.

FIG. 5 is an example graph 500 of bandwidth stacks depicting the BFS application running on 8 cores with 1 DDR4 memory controller, in accordance with implementations herein. The graph 500 of the bandwidth stacks is taken through time 520 (shown in milliseconds (ms)), showing a bandwidth stack 510 for each time step.

Although not specifically shown, the bandwidth components in a corresponding cycle stack will have grown, reducing the base components versus the 4-core execution, so implicating a lower instruction per cycle (IPC) due to the bandwidth limits. The graph 500 of the bandwidth stack shows that the memory chip is now almost fully utilized in the memory-bound phases (e.g., the idle component is almost 0).

In graph 500, the bandwidth increase in the middle phase (from 10 GB/s for 4 cores to 16 GB/s for 8 cores) does not double (or saturate at the peak bandwidth). This is due to the constraints, refresh rate, and activate commands components. Furthermore, the increase in the constraints component in the first phase can be noted. In this example, there is a large fraction of writes (write component versus read component) in the BFS application during this first phase, causing frequent switches between reads and writes, which has a time penalty in the memory module of the DRAM. This penalty is accounted for in the constraints component, which further limits the bandwidth usage. Therefore, bandwidth usage increases from about 6 GB/s to about 10 GB/s, again less than a doubling, although bandwidth usage is far beneath peak bandwidth. The constraints also cause a higher DRAM-bandwidth component in the first phase of the cycle stack.

Because writes play a role in the bandwidth constraints, a future processor design could be implemented that increases the write buffer in the memory controller to reduce the number of switches between reads and writes (writes are done in bursts, as soon as the write buffer fills up, a write burst is launched). In some implementations, increasing the DRAM write buffer from 32 to 128 entries for BFS on 8 cores could also improve performance by 1.5%.

In some implementations, the bandwidth stack generator may provide for scaling extrapolation. Increasing parallelism is one approach to improve performance of a computing device. However, the performance improvement may be limited by multiple factors. One factor can include memory bandwidth. For example, more threads consume more bandwidth, and once bandwidth is saturated, performance stops scaling. In implementations herein, bandwidth stacks can be utilized by extrapolating bandwidth usage and scaling when parallelism is increased.

One technique to extrapolate bandwidth usage is to multiply bandwidth usage at 1 thread/core by the thread/core count and limit it by the peak bandwidth. For example, a BFS application can use 2.1 GB/s at 1 core. Accordingly, at 8 cores it can be naively extrapolated to use 16.8 GB/s, which is below the peak bandwidth of 19.2 GB/s (or 18.5 GB/s when considering refresh) and the application scales linear. However, real bandwidth usage at 8 cores is actually 11.7 GB/s, which is an increase of 5.6× (and not 8× as linearly extrapolated).

Bandwidth stacks of implementations herein can provide a more accurate extrapolation, using the insight that not only the bandwidth usage, but also the limiting components, scale with thread count. For example, more threads cause more banks precharging/activating and/or enforcing constraints. By scaling all components with thread count, except for the idle components (idle and bank-idle), and limiting the bandwidth usage as soon as the sum of all non-idle components reaches the peak bandwidth, a more accurate prediction of the bandwidth usage at higher core counts can be obtained, and thus a more accurate prediction of how performance scales.

Figure 6:
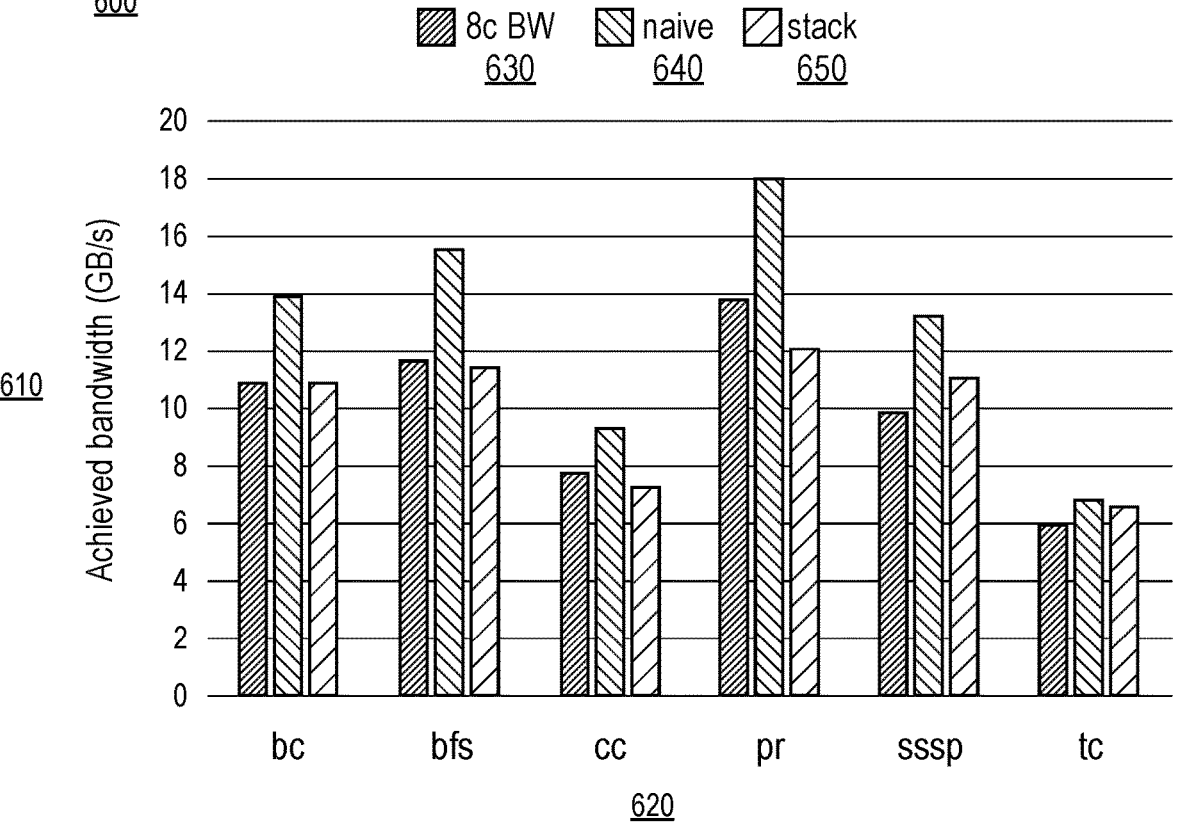
FIG. 6 is a graph depicting scaling extrapolation utilizing bandwidth stacks, in accordance with implementations herein.

FIG. 6 is a graph 600 depicting scaling extrapolation utilizing bandwidth stacks, in accordance with implementations herein. The graph 600 illustrates the measured bandwidth usage 610 for various different applications 620 (e.g., 6 graph benchmarks) at an 8 core (8c) implementation 630. The graph 600 also depicts a naively extrapolated bandwidth usage (from the 1 core execution) 640 and the extrapolation using bandwidth stacks 650. Graph 600 depicts an improved accuracy of the bandwidth stack extrapolation technique 650 over the naïve extrapolation approach 640 (i.e., extrapolation 650 is closer to the actual 8c bandwidth implementation 630 as compared to the naïve extrapolation 640 implementation. In some implementations, this scaling extrapolation technique can be used in developer tools that indicate and project potential performance improvements.

FIG. 7 is a flow diagram illustrating an embodiment of a method 700 for generating a memory bandwidth stack for visualizing memory bandwidth utilization. Method 700 may be performed by processing logic that may comprise hardware (e.g., circuitry, dedicated logic, programmable logic, etc.), software (such as instructions run on a processing device), or a combination thereof. More particularly, the method 700 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 700 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-6 may not be repeated or discussed hereafter. In one implementation, a datacenter system implementing bandwidth stack generator, such as bandwidth stack generator 110, 120, 130, 140 of FIG. 1 and/or bandwidth stack generator 205 of FIG. 2, may perform method 700.

The example process of method 700 of FIG. 7 begins at block 710 where a processing device executing a bandwidth stack generator may receive data corresponding to a memory cycle of an application executed by the one or more processors. At block 720, the processing device may, for each memory cycle occurring during a total execution time of the application, assign the memory cycle to a component of a bandwidth stack based on analysis of the data and in accordance with a prioritization scheme so that each memory cycle is assigned to one component of the bandwidth stack.

Subsequently, at block 730, the processing device may, for each component, determine the portion of the bandwidth stack to account to the component based on the assignment of the memory cycles to the component. Lastly, at block 740, the processing device may generate the bandwidth stack by representing each of the portions accounted to each component in the bandwidth stack.

FIG. 8 is a flow diagram illustrating an embodiment of a method 800 for applying a prioritization scheme for assigning memory cycle to a bandwidth stack for visualizing memory bandwidth utilization. Method 800 may be performed by processing logic that may comprise hardware (e.g., circuitry, dedicated logic, programmable logic, etc.), software (such as instructions run on a processing device), or a combination thereof. More particularly, the method 800 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-7 may not be repeated or discussed hereafter. In one implementation, a datacenter system implementing bandwidth stack generator, such as bandwidth stack generator 110, 120, 130, 140 of FIG. 1 and/or bandwidth stack generator 205 of FIG. 2, may perform method 800.

The example process of method 800 of FIG. 8 begins at block 810 where a processing device executing a bandwidth stack generator may receive memory cycle data of an application, the memory cycle data corresponding to a memory module. Then, at block 820, the processing device may, if the memory cycle data indicates a read or write, assign the memory cycle to the respective read or write component. At block 830, the processing device may, if memory cycle data is not read or write and indicates a refresh, assign the memory cycle to the refresh component.

Subsequently, at block 840, the processing device may, if memory cycle data is not a refresh, examine state of each bank of the memory module, where n is the number of banks of the memory module. Then, at block 840, the processing device performs a plurality of operations for each bank of the memory module. The plurality of operations includes blocks 842, 844, and 846. At block 842, the processing device may, if the bank is precharging or activating, assign 1/n cycle to the respective precharging or activating component. At block 844, the processing device may, if the bank is idle, check bank group and rank timing constraints and assign 1/n cycle to the constraints component if read/write delayed because of constraint. At block 846, the processing device may, if no other constraints, assign 1/n cycle to bank idle component.

Subsequently, at block 850, the processing device may, if all banks idle, check timing constraints on the rank and bank group and assign memory cycle to the constraints component if delay due to constraint. Lastly, at block 860, the processing device may, if all banks idle and no constraints preventing read/write, assign cycle to all idle component.

Figure 9:
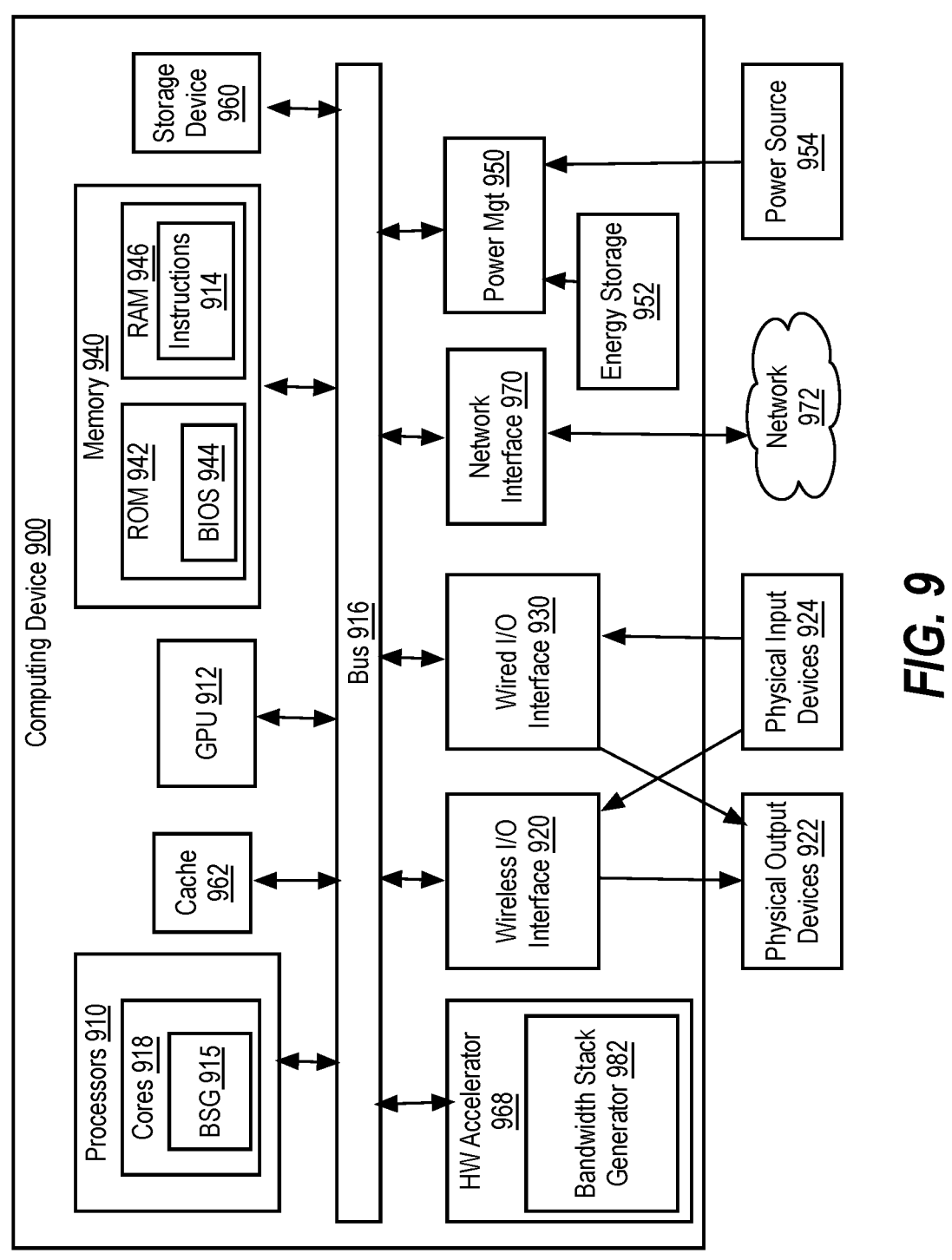
FIG. 9 is a schematic diagram of an illustrative electronic computing device to enable generating a memory bandwidth stack for visualizing memory bandwidth utilization, in accordance with implementations herein.

FIG. 9 is a schematic diagram of an illustrative electronic computing device 900 to enable generating a memory bandwidth stack for visualizing memory bandwidth utilization, according to some embodiments. In some embodiments, the computing device 900 includes one or more processors 910 including one or more processors cores 918 including a bandwidth stack generator (BSG) 915, such as bandwidth stack generator 110, 120, 130, 140 of FIG. 1 and/or bandwidth stack generator 205 of FIG. 2. In some embodiments, the computing device 900 includes a hardware accelerator 968, the hardware accelerator including a bandwidth stack generator 982, such as bandwidth stack generator 110, 120, 130, 140 of FIG. 1 and/or bandwidth stack generator 205 of FIG. 2. In some embodiments, the computing device is to provide generating a memory bandwidth stack for visualizing memory bandwidth utilization, as provided in FIGS. 1-8.

The computing device 900 may additionally include one or more of the following: cache 962, a graphical processing unit (GPU) 912 (which may be the hardware accelerator in some implementations), a wireless input/output (I/O) interface 920, a wired I/O interface 930, system memory 940 (e.g., memory circuitry), power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 9 are of conventional design. Consequently, such blocks are not described in further detail herein, as they can be understood by those skilled in the relevant art. The bus 916 that interconnects at least some of the components of the computing device 900 may employ any currently available or future developed serial or parallel bus structures or architectures.

The system memory 940 may include read-only memory ("ROM") 942 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

The following examples pertain to further embodiments. Example 1 is an apparatus to facilitate generating a memory bandwidth stack for visualizing memory bandwidth utilization. The apparatus of Example 1 comprises one or more processors to: receive data corresponding to a memory cycle occurring during a total execution time of an application executed by the one or more processors; for the memory cycle, assign the memory cycle to a component of a bandwidth stack based on analysis of the data and in accordance with a prioritization scheme; for the component, determine a portion of the bandwidth stack to account to the component based at least in part on the assignment of the memory cycle to the component; and generate the bandwidth stack by at least representing the portion accounted to the component in the bandwidth stack.

In Example 2, the subject matter of Example 1 can optionally include wherein the components of the bandwidth stack comprise one or more of a read component, a write component, a precharge component, an activate component, a refresh component, a constraints component, a bank idle component, or an all idle component. In Example 3, the subject matter of any one of Examples 1-2 can optionally include wherein a top of the bandwidth stack equals a peak bandwidth of a memory module providing the memory cycle.

In Example 4, the subject matter of any one of Examples 1-3 can optionally include wherein the prioritization scheme comprises assigning the memory cycle to one component of the bandwidth stack. In Example 5, the subject matter of any one of Examples 1-4 can optionally include wherein the prioritization scheme is a hierarchical accounting providing a priority to the components for assignment to the memory cycle. In Example 6, the subject matter of any one of Examples 1-5 can optionally include wherein the hierarchical accounting assigns priority, from highest to lowest, to the components as follows: read or write, refresh, precharge or activate, constraints, bank idle, and all idle.

In Example 7, the subject matter of any one of Examples 1-6 can optionally include wherein the prioritization scheme assigns the memory cycles to a portion of a cycle, the portion determined based on a number of banks of a memory module providing the memory cycle. In Example 8, the subject matter of any one of Examples 1-7 can optionally include wherein the one or more processor are further to extrapolate bandwidth usage to scale with thread count of the one or more processors. In Example 9, the subject matter of any one of Examples 1-8 can optionally include wherein a dynamic random access memory (DRAM) memory module performs the memory cycle.

Example 10 is a non-transitory computer-readable storage medium for facilitating generating a memory bandwidth stack for visualizing memory bandwidth utilization. The non-transitory computer-readable storage medium of Example 10 having stored thereon executable computer program instructions that, when executed by one or more processors, cause the one or more processors to perform operations comprising: receiving, by the one or more processors, data corresponding to a memory cycle occurring during a total execution time of an application executed by the one or more processors; for the memory cycle, assigning the memory cycle to a component of a bandwidth stack based on analysis of the data and in accordance with a prioritization scheme; for the component, determining a portion of the bandwidth stack to account to the component based at least in part on the assignment of the memory cycle to the component; and generating the bandwidth stack by at least representing the portion accounted to the component in the bandwidth stack.

In Example 11, the subject matter of Example 10 can optionally include wherein the components of the bandwidth stack comprise one or more of a read component, a write component, a precharge component, an activate component, a refresh component, a constraints component, a bank idle component, or an all idle component. In Example 12, the subject matter of Examples 10-11 can optionally include wherein a top of the bandwidth stack equals a peak bandwidth of a memory module providing the memory cycle. In Example 13, the subject matter of Examples 10-12 can optionally include wherein the prioritization scheme comprises assigning the memory cycle to one component of the bandwidth stack, and wherein the prioritization scheme is a hierarchical accounting providing a priority to the components for assignment to the memory cycle.

In Example 14, the subject matter of Examples 10-13 can optionally include wherein the hierarchical accounting assigns priority, from highest to lowest, to the components as follows: read or write, refresh, precharge or activate, constraints, bank idle, and all idle. In Example 15, the subject matter of Examples 10-14 can optionally include wherein the prioritization scheme assigns the memory cycles to a portion of a cycle, the portion determined based on a number of banks of a memory module providing the memory cycle.

Example 16 is a method for facilitating generating a memory bandwidth stack for visualizing memory bandwidth utilization. The method of Example 16 can include receiving, by one or more processors, data corresponding to a memory cycle occurring during a total execution time of an application executed by the one or more processors; for the memory cycle, assigning the memory cycle to a component of a bandwidth stack based on analysis of the data and in accordance with a prioritization scheme; for the component, determining a portion of the bandwidth stack to account to the component based at least in part on the assignment of the memory cycle to the component; and generating the bandwidth stack by at least representing the portion accounted to the component in the bandwidth stack.

In Example 17, the subject matter of Example 16 can optionally include wherein the components of the bandwidth stack comprise one or more of a read component, a write component, a precharge component, an activate component, a refresh component, a constraints component, a bank idle component, or an all idle component. In Example 18, the subject matter of Examples 16-17 can optionally include wherein a top of the bandwidth stack equals a peak bandwidth of a memory module providing the memory cycle.

In Example 19, the subject matter of Examples 16-18 can optionally include wherein the prioritization scheme comprises assigning the memory cycle to one component of the bandwidth stack, and wherein the prioritization scheme is a hierarchical accounting providing a priority to the components for assignment to the memory cycle. In Example 20, the subject matter of Examples 16-19 can optionally include wherein the prioritization scheme assigns the memory cycles to a portion of a cycle, the portion determined based on a number of banks of a memory module providing the memory cycle.

Example 21 is a system for facilitating generating a memory bandwidth stack for visualizing memory bandwidth utilization. The system of Example 21 can optionally include a memory to store a block of data, and a processor communicably coupled to the memory to: receive data corresponding to a memory cycle occurring during a total execution time of an application executed by the one or more processors; for the memory cycle, assign the memory cycle to a component of a bandwidth stack based on analysis of the data and in accordance with a prioritization scheme; for the component, determine a portion of the bandwidth stack to account to the component based at least in part on the assignment of the memory cycle to the component; and generate the bandwidth stack by at least representing the portion accounted to the component in the bandwidth stack.

In Example 22, the subject matter of Example 21 can optionally include wherein the components of the bandwidth stack comprise one or more of a read component, a write component, a precharge component, an activate component, a refresh component, a constraints component, a bank idle component, or an all idle component. In Example 23, the subject matter of any one of Examples 21-22 can optionally include wherein a top of the bandwidth stack equals a peak bandwidth of a memory module providing the memory cycle.

In Example 24, the subject matter of any one of Examples 21-23 can optionally include wherein the prioritization scheme comprises assigning the memory cycle to one component of the bandwidth stack. In Example 25, the subject matter of any one of Examples 21-24 can optionally include wherein the prioritization scheme is a hierarchical accounting providing a priority to the components for assignment to the memory cycle. In Example 26, the subject matter of any one of Examples 21-25 can optionally include wherein the hierarchical accounting assigns priority, from highest to lowest, to the components as follows: read or write, refresh, precharge or activate, constraints, bank idle, and all idle.

In Example 27, the subject matter of any one of Examples 21-26 can optionally include wherein the prioritization scheme assigns the memory cycles to a portion of a cycle, the portion determined based on a number of banks of a memory module providing the memory cycle. In Example 28, the subject matter of any one of Examples 21-27 can optionally include wherein the one or more processor are further to extrapolate bandwidth usage to scale with thread count of the one or more processors. In Example 29, the subject matter of any one of Examples 21-28 can optionally include wherein a dynamic random access memory (DRAM) memory module performs the memory cycle.

Example 30 is an apparatus for facilitating generating a memory bandwidth stack for visualizing memory bandwidth utilization, comprising means for receiving data corresponding to a memory cycle occurring during a total execution time of an application executed by one or more processors; for the memory cycle, means for assigning the memory cycle to a component of a bandwidth stack based on analysis of the data and in accordance with a prioritization scheme; for the component, means for determining a portion of the bandwidth stack to account to the component based at least in part on the assignment of the memory cycle to the component; and generating the bandwidth stack by at least representing the portion accounted to the component in the bandwidth stack. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating generating a memory bandwidth stack for visualizing memory bandwidth utilization, configured to perform the method of any one of Examples 16-20. Example 34 is an apparatus for facilitating generating a memory bandwidth stack for visualizing memory bandwidth utilization, comprising means for performing the method of any one of Examples 16-20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
one or more processors to:
    receive data corresponding to a memory cycle occurring during a total execution time of an application executed by the one or more processors;
    for the memory cycle of the application, assign the memory cycle to a component of components of a bandwidth stack based on analysis of the data and in accordance with a prioritization scheme that comprises a hierarchical accounting providing a priority to the components for assignment to the memory cycle, wherein the memory cycle is broken into cycle portions and each component is assigned to the cycle portions of the memory cycle based on the priority;
    for the component, determine a stack portion of the bandwidth stack to account to the component based at least in part on the assignment of a corresponding cycle portion of the cycle portions of the memory cycle to the component; and
    generate the bandwidth stack by at least representing the stack portion accounted to the component in the bandwidth stack.

2. The apparatus of claim 1, wherein the components of the bandwidth stack comprise one or more of a read component, a write component, a precharge component, an activate component, a refresh component, a constraints component, a bank idle component, or an all idle component.

3. The apparatus of claim 1, wherein a top of the bandwidth stack equals a peak bandwidth of a memory module providing the memory cycle.

4. The apparatus of claim 1, wherein the prioritization scheme comprises assigning each of the cycle portions of the memory cycle to one component of the bandwidth stack.

5. The apparatus of claim 4, wherein the hierarchical accounting assigns priority, from highest to lowest, to the components as follows: read or write, refresh, precharge or activate, constraints, bank idle, and all idle.

6. The apparatus of claim 1, wherein the cycle portions of the memory cycle are determined based on a number of banks of a memory module providing the memory cycle.

7. The apparatus of claim 1, wherein the one or more processors are further to extrapolate bandwidth usage to scale with thread count of the one or more processors.

8. The apparatus of claim 1, wherein a dynamic random access memory (DRAM) memory module performs the memory cycle.

9. A non-transitory computer-readable storage medium having stored thereon executable computer program instructions that, when executed by one or more processors, cause the one or more processors to perform operations comprising:
    receiving, by the one or more processors, data corresponding to a memory cycle occurring during a total execution time of an application executed by the one or more processors;
    for the memory cycle, assigning the memory cycle to a component of components of a bandwidth stack based on analysis of the data and in accordance with a prioritization scheme that comprises a hierarchical accounting providing a priority to the components for assignment to the memory cycle, wherein the memory cycle is broken into cycle portions and each component is assigned to the cycle portions of the memory cycle based on the priority;
    for the component, determining a stack portion of the bandwidth stack to account to the component based at least in part on the assignment of a corresponding cycle portion of the cycle portions of the memory cycle to the component; and
    generating the bandwidth stack by at least representing the stack portion accounted to the component in the bandwidth stack.

10. The non-transitory computer-readable storage medium of claim 9, wherein the components of the bandwidth stack comprise one or more of a read component, a write component, a precharge component, an activate component, a refresh component, a constraints component, a bank idle component, or an all idle component.

11. The non-transitory computer-readable storage medium of claim 9, wherein a top of the bandwidth stack equals a peak bandwidth of a memory module providing the memory cycle.

12. The non-transitory computer-readable storage medium of claim 9, wherein the prioritization scheme comprises assigning each of the cycle portions of the memory cycle to one component of the bandwidth stack.

13. The non-transitory computer-readable storage medium of claim 12, wherein the hierarchical accounting assigns priority, from highest to lowest, to the components as follows: read or write, refresh, precharge or activate, constraints, bank idle, and all idle.

14. The non-transitory computer-readable storage medium of claim 9, wherein the cycle portion of the memory cycle is determined based on a number of banks of a memory module providing the memory cycle.

15. A method comprising:
    receiving, by one or more processors, data corresponding to a memory cycle occurring during a total execution time of an application executed by the one or more processors;
    for the memory cycle, assigning the memory cycle to a component of components of a bandwidth stack based on analysis of the data and in accordance with a prioritization scheme that comprises a hierarchical accounting providing a priority to the components for assignment to the memory cycle, wherein the memory cycle is broken into cycle portions and each component is assigned to the cycle portions of the memory cycle based on the priority;
    for the component, determining a stack portion of the bandwidth stack to account to the component based at least in part on the assignment of a corresponding cycle portion of the cycle portion of the memory cycle to the component; and
    generating the bandwidth stack at least by representing the stack portion accounted to the component in the bandwidth stack.

16. The method of claim 15, wherein the components of the bandwidth stack comprise one or more of a read component, a write component, a precharge component, an activate component, a refresh component, a constraints component, a bank idle component, or an all idle component.

17. The method of claim 15, wherein a top of the bandwidth stack equals a peak bandwidth of a memory module providing the memory cycle.

18. The method of claim 15, wherein the prioritization scheme comprises assigning each of the cycle portions of the memory cycle to one component of the bandwidth stack.

19. The method of claim 15, wherein the cycle portion determined based on a number of banks of a memory module providing the memory cycle.

\* \* \* \* \*